(12) United States Patent  (10) Patent No.: US 9,073,134 B2
Koeder et al.  (45) Date of Patent: Jul. 7, 2015

(54) POWER TOOL, PARTICULARLY A HAND-HELD POWER TOOL

(75) Inventors: Thilo Koeder, Gerlingen (DE); Joachim Platzer, Remseck-Hochberg (DE)

(73) Assignee: Robert Bosch GmbH, Stuttgart (DE)

( * ) Notice: Subject to any disclaimer, the term of this patent is extended or adjusted under 35 U.S.C. 154(b) by 655 days.

(21) Appl. No.: 12/992,130

(22) PCT Filed: Mar. 16, 2009

(86) PCT No.: PCT/EP2009/053046
§ 371 (c)(1),
(2), (4) Date: Dec. 3, 2010

(87) PCT Pub. No.: WO2009/138271
PCT Pub. Date: Nov. 19, 2009

(65) Prior Publication Data
US 2011/0067248 A1  Mar. 24, 2011

(30) Foreign Application Priority Data
May 14, 2008  (DE) .......................... 10 2008 001 757

(51) Int. Cl.
*B26D 1/00*  (2006.01)
*B26D 5/00*  (2006.01)
*B23D 59/00*  (2006.01)
*B23D 51/16*  (2006.01)
*B23D 51/10*  (2006.01)

(52) U.S. Cl.
CPC .............. *B23D 59/002* (2013.01); *B23D 51/16* (2013.01); *B23D 51/10* (2013.01)

(58) Field of Classification Search
USPC ................ 30/392–394; 83/13, 364, 369, 370; 700/279; 144/154.5
See application file for complete search history.

(56) References Cited

U.S. PATENT DOCUMENTS

| | | | | |
|---|---|---|---|---|
| 3,504,716 A * | 4/1970 | Morganson et al. | ............ | 30/123 |
| 3,610,081 A * | 10/1971 | Garber | .............. | 83/62 |
| 4,305,128 A * | 12/1981 | Manabe et al. | ............... | 700/160 |
| 4,737,614 A * | 4/1988 | Richardson | ............. | 219/130.01 |
| 5,010,652 A | 4/1991 | Miletich | | |
| 5,928,137 A * | 7/1999 | Green | ......................... | 600/160 |
| 6,142,047 A * | 11/2000 | Galan et al. | ....................... | 83/74 |
| 7,170,076 B2 * | 1/2007 | Butler et al. | ............. | 250/559.29 |
| 7,593,118 B2 * | 9/2009 | Tropf | ............................ | 356/614 |

(Continued)

FOREIGN PATENT DOCUMENTS

| | | |
|---|---|---|
| CN | 2693410 | 4/2005 |
| DE | 30 00 390 | 7/1981 |

(Continued)

*Primary Examiner* — Omar Flores Sanchez
(74) *Attorney, Agent, or Firm* — Michael J. Striker

(57) ABSTRACT

The invention relates to a power tool (1), especially in the form of a hand-held jigsaw (2). In order to allow for a semi-autonomous operation which assists the user to guide the tool, the tool is provided with a sensor system (27) for observing a detection surface (31, 43) within which the desired working direction is detected as a path default (23) for the saw blade (8) serving as the tool (7) with respect to its alignment relative to the jigsaw (2), the detected path default being intended for downstream control means (26). Said control means align the saw blade (8) relative to the path default (23) by rotating it about its longitudinal axis (25) so that the user guiding the saw blade (2) only has to make sure that the path default (23) extends inside the detection surface (31, 43).

19 Claims, 2 Drawing Sheets

(56) References Cited

U.S. PATENT DOCUMENTS

| | | | |
|---|---|---|---|
| 8,622,568 B2* | 1/2014 | Koeder et al. | 362/119 |
| 8,714,064 B2* | 5/2014 | Koeder et al. | 83/75 |
| 2003/0005588 A1* | 1/2003 | Gass et al. | 30/382 |
| 2003/0079583 A1 | 5/2003 | Funakoshi et al. | |
| 2005/0060896 A1* | 3/2005 | Park | 30/392 |
| 2005/0103766 A1 | 5/2005 | Iizuka et al. | |
| 2008/0229589 A1 | 9/2008 | Bone | |
| 2008/0252726 A1 | 10/2008 | Chan et al. | |
| 2008/0302226 A1* | 12/2008 | Fischer | 83/520 |
| 2009/0025233 A1 | 1/2009 | Kaiser et al. | |
| 2009/0044680 A1 | 2/2009 | Elhaus | |

FOREIGN PATENT DOCUMENTS

| | | |
|---|---|---|
| DE | 20 2004 005 478 | 7/2004 |
| DE | 10 2006 011 131 | 9/2007 |
| EP | 1 980 363 | 10/2008 |
| EP | 2 000 243 | 12/2008 |
| GB | 2 325 107 | 11/1998 |
| SE | 8008742 | 6/1982 |
| WO | 2008/055738 | 5/2008 |

* cited by examiner

POWER TOOL, PARTICULARLY A HAND-HELD POWER TOOL

CROSS-REFERENCE

The invention described and claimed hereinbelow is also described in PCT/EP2009/053046, filed on Mar. 16, 2009 and DE 10 2008 001 757.4, filed on May 14, 2008. This German Patent Application, whose subject matter is incorporated here by reference, provides the basis for a claim of priority of invention under 35 U.S.C. 119 (a)-(d).

The invention relates to a power tool, in particular a hand-held power tool.

BACKGROUND INFORMATION

For users of such power tools, which are typically driven by an electric motor and are often used in practical applications as jigsaws or circular saws, the view of the particular processing point and a related specified path, which is indicated by a marking, in the region of the processing point is often greatly limited. This negatively affects the quality of work that can be achieved. To prevent this, assistance systems in the form of auxiliary devices are used, which support guidance of the power tool in a manner oriented toward the particular specified path as the working path to follow. Power tools of that type, which are designed as jigsaws and circular saws, are therefore often provided with laterally extending guide shoes which are disposed on arms which can be adjusted relative to the power tool, and which rest along a guide track parallel to the specified path and can be displaced in the working direction of the power tool, wherein the guide track can also be formed e.g. by an edge of the work piece that extends parallel to the specified path.

Apart from the fact that auxiliary devices of that type are mechanically complex and are limited in terms of their possible uses, they must be adjusted. Furthermore, preliminary work must be performed at times to create such guide tracks.

SUMMARY OF THE INVENTION

The object of the invention is to provide the user with better ways to guide the power tool in a manner oriented to the specified path. Furthermore, in certain cases, when certain preconditions regarding the power tool exist, to actively support the user in guiding the power tool oriented to the specified path.

Improved ways for the user to guide the power tool in a manner oriented to the specified path are initially created by designing the auxiliary device as a sensor system having a detection area that overlaps the working region of the tool, and by providing means in the viewing field of the user for visualizing the position of the detection area relative to the specified path. The detection area therefore provides the user with a much larger observation and/or orientation region, which is based on a starting position with a position of the detection area that is calibrated relative to the specified path, as compared to a specified path in the form of a marking such as a guide line. The depiction of the observation and/or orientation region to the user is not bound to the position of the working region. Instead, the depiction thereof can be presented in any other way in the viewing field of the user. This is accomplished using means for visualizing the detection area and the position of the detection area relative to the specified path. As a result, the visualization of the detection area, overall, becomes an orientation tool for the user.

The position of the detection area relative to the specified path can be visualized using mechanical or optical display means; mechanical display means can be formed e.g. by parts of the power tool. In the case of a jigsaw, for example, in the form of a cut-out formed in the base plate thereof, as an at least partial boundary of the detection area. Mechanical display means can also be provided outside of the actual working region e.g. assigned to the base plate as arrow-shaped or triangular cut-outs and projections that point toward the specified path, and therefore, when oriented relative to the specified path, a position of the detection area results that is calibrated relative to the specified path.

If optical means are provided for displaying the position of the detection area and/or the position relative to the specified path, they can be formed—relative to the detection area—e.g. by an illuminated field and/or lines of light, light beams, or points of light, the same also applying for optical display means that mark the calibrated position of the detection area relative to the specified path.

To visualize the position of the detection area relative to the specified path in a user-friendly manner independently of the position of the detection area relative to the power tool, a display element, in particular an optical display element, can be provided on the housing of the power tool at a distance from the working region, which visualizes the position of the detection area and, therefore, at least indirectly, the position of the working surface and the power tool relative to the specified path; any deviations from the specified path are visualized in a symbolized manner, and possibly symbolized in a manner that is weighted in terms of the degree of the deviation from the specified path. This should be made noticeable to the user, in particular using color, so that the user can guide the power tool accordingly.

This is expedient, in particular, in combination with a design of the power tool according to the invention as a semi-autonomous jigsaw that includes a saw blade that is pivotable about an axis extending in the longitudinal direction thereof, and that is directionally guided using a servo device oriented relative to the specified path, and so the user—oriented on the position of the detection area relative to the specified path—need only approximately specify the working direction of the power tool since the tool controls the exact positioning of the saw blade relative to the specified path i.e. relative to the jigsaw, with the saw blade oriented accordingly. To this end, the saw blade, which is rotatable about the longitudinal axis thereof, is acted upon by an actuator system that is controlled by a control unit which, in combination with a computer unit, converts the positional values detected by the sensor system into actuator motions for the saw blade which is rotatable about the longitudinal axis thereof.

The invention therefore also provides a method for operating a power tool, in particular a power tool of the aforementioned type, in the case of which the position of the detection area of a sensor system and, therefore indirectly the position of the power tool relative to a specified path are signalled. This is carried out in a manner that is easily recognized by a user, wherein the characteristic values detected using the sensor system are converted by the semi-autonomous guidance of the power tool into adjustment values for the tool, in particular for a saw blade, which orient the same relative to the specified path, and therefore, in conjunction with the approximate orientation performed by the user to the position of the detection surface relative to the specified path, precise machining is achieved along the specified path.

The detection area, which is large relative to a usually linear specified path, provides the user with the advantage of orientation on an area instead of on a line—which is usually difficult to as certain—as the specified path, and also makes it possible for a warning signal to be triggered and/or for the machine to be shut off if the user guides the power tool carelessly and displaces the detection area from the position thereof in which it overlaps the specified path, thereby ensuring, e.g. by the user becoming accustomed to the semi-autonomous operation, that inattentiveness and errors by the user as he guides the power tool do not result in damage to the work piece.

The invention is particularly advantageous for placing the power tool in the correct position on the particular work piece, that is, for making the first cut in the particular work piece at the point marked by the specified path. As the specified path, the detection area specifies a region in which the power tool need be displaced only transversely to the specified path, in particular needing only to be slid while lying on the work piece, until the rotational axis of the tool which lies in the center of the detection area—e.g. the saw blade of a jigsaw—cuts the marking line as the specified path. The user then merely needs to orient the power tool relative to the specified path. In the case of semi-autonomous operation of the power tool, in particular of the jigsaw, and setting the rotary position of the saw blade using an actuator system relative to the specified path, the orientation is implemented by specifying a corresponding rotary position, thereby ensuring that the user mainly only needs to provide support. Power tools that are operated using this assistance function, in particular jigsaws, therefore reduce the work to be performed by the user, even when starting work on a work piece, to primarily placing the machine such that the detection area overlaps the specified path, and then supporting the machine while the orientation relative to the specified path is performed by the machine.

Further details and features of the invention result from the claims. Furthermore, the invention is explained below with reference to an embodiment that shows a power tool in the form of a jigsaw which, as a jigsaw to be operated semi-autonomously, comprises a saw blade that is rotatable about the longitudinal axis—as the rotational axis—thereof, the rotary position of which can be adjusted using an actuator system. The drawing shows:

DETAILED DESCRIPTION OF THE PREFERRED EMBODIMENTS

Figure 1:
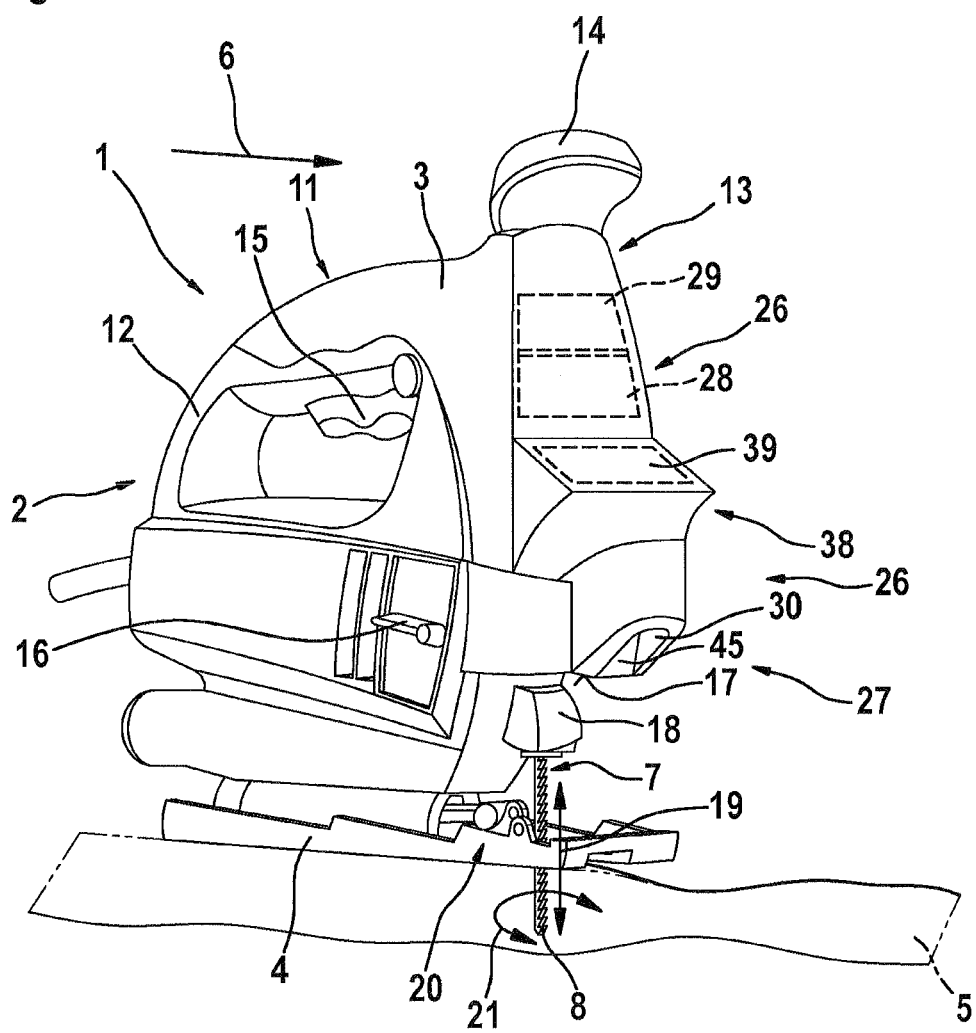
FIG. 1 a perspective depiction of the jigsaw in the working position thereof, in which it is placed on a work piece, FIG. 2 a schematic top view of a display element provided on the front side of the housing—as shown in FIG. 1—of the jigsaw, and FIGS. 3 and 4 a schematic top view of the working region of the base plate of the jigsaw, through which the saw blade extends.

FIG. 1 shows, as an example of a power tool 1, a hand-held machine in the form of a jigsaw 2 that comprises a housing 3 and is supported on a work piece 5 by a base plate 4.

Jigsaw 2 comprises, in the front, relative to the working direction, a saw blade 8 as the working tool 7. In the working mode, it engages in work piece 5, on which jigsaw 2 is displaceably supported using base plate 4 thereof.

Figure 3:
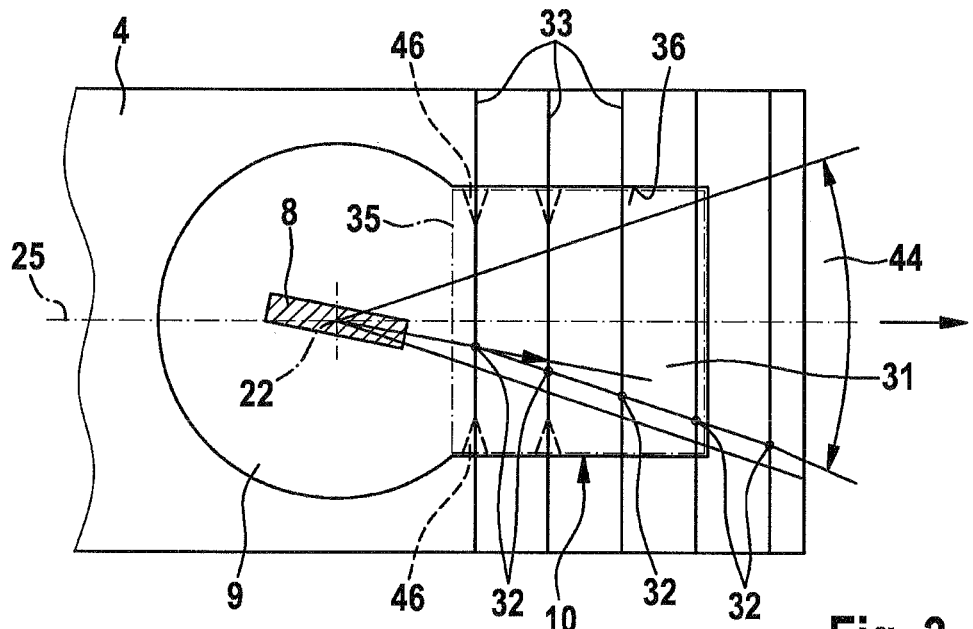
Figure 4:
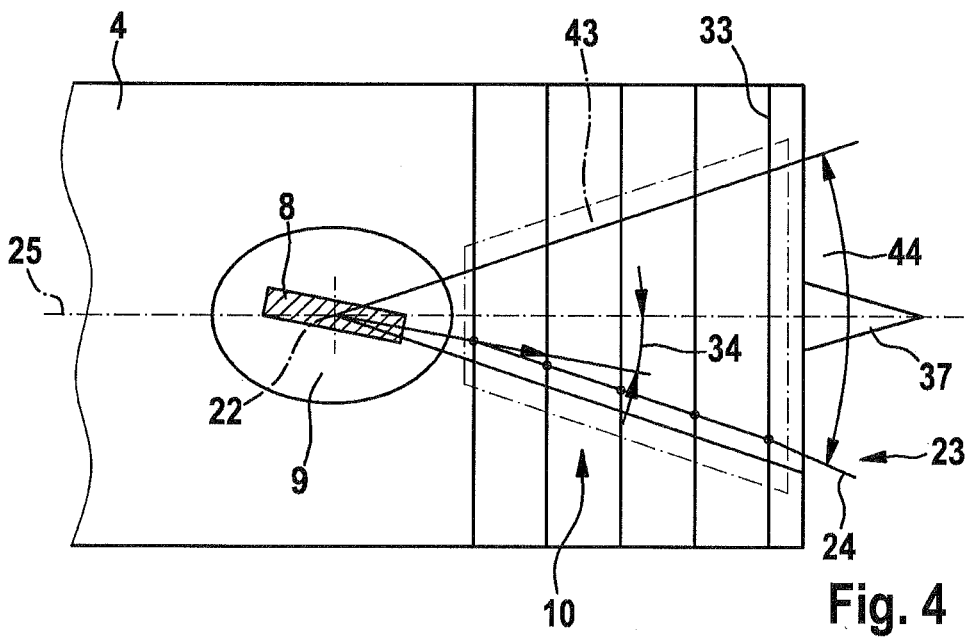

In the embodiment, jigsaw 2 is designed such that a viewing field 10 results for the user that preferably extends at least across the range of working region 9, which is determined by saw blade 8 and is illustrated in FIGS. 3 and 4 and, as shown, typically extends beyond working region 9 in working direction 6 to provide the user with the best possible overview of the working conditions, including those to come.

Housing 3 of jigsaw 2 is substantially conventional in design and comprises a U-shaped handle 11 which is disposed opposite—in the vertical direction—to base plate 4 which is supported in a manner such that it can be locked in position about a swivel axis that extends in working direction 6, handlebar 12 of said handle 11 extending in working direction 6 and, on the front side thereof, entering front-wall region 13 of housing 3. At the top, it transitions into a guide knob 14. Working direction 6 and, therefore, the swivel axis of base plate 4 extend in the direction of sawing when the saw blade plane contains longitudinal axis 25, the sawing direction corresponding to the straight-ahead working direction of jigsaw 2.

A switch system 15 is provided in the region of handle 11, on the underside handlebar 12, and is used to turn power tool 1 on and off. Different operating modes of jigsaw 2 can be selected using switch device 16 provided on the longitudinal side of housing 3.

Front-wall region 13 of housing 3 is offset in the downward direction, i.e. in the direction toward base plate 4, in a stepped manner opposite working direction 6. Resultant step 17 extends over tool fitting 18 for driven working tool 7 formed as saw blade 8.

Saw blade 8 of entirely electrically driven power tool 1 is driven in a reciprocating manner, as indicated by arrow 19. A servo drive 20 is used to implement a further working mode of saw blade 8, namely a reciprocating-pendulum mode, in which saw blade 8 can swivel about a swivel axis (not depicted) which extends transversely to the plane of the paper and is superposed on the reciprocating motion. In a third operating mode, which is indicated by arrow 21, saw blade 8 can be swiveled about a rotational axis 22 which extends in the direction of the longitudinal axis thereof, in addition to performing the reciprocating motion. As a result, as illustrated in FIGS. 3 and 4, saw blade 8 can be displaced into working directions that extend at an angle relative to the straight-ahead working direction thereof, thereby enabling jigsaw 2 to be used as a "scrolling jigsaw", and as a semi-autonomous jigsaw when displaced in a thusly controlled manner. In that case, the user who is holding jigsaw 2 merely moves it forward in the direction roughly defined by working direction 6. The exact positioning of jigsaw 2, which corresponds to a specified path 23, is achieved by setting saw blade 2 in a rotary position that corresponds to particular specified path 23.

In FIGS. 3 and 4, specified path 23 is formed by a marking line 24. In the working situation depicted, marking line 24 has an intersection point with rotational axis 22, through which longitudinal axis 25—which is also indicated—of jigsaw 2 extends. Proceeding from rotational axis 22, specified path 23 extends, in the form of marking line 24, in working direction 6, with an increasing lateral offset relative to longitudinal axis 25. Control means 26 are used to detect such working conditions and orient the rotary position of saw blade 8 to specified path 23; control means 26 comprise e.g. a sensor system 27, a computer unit 28, and a servo unit 29. Control means 26 can automate the guidance of saw blade 8 along specified path 23 and the rotatability of saw blade 8 about rotational axis 22 extending in the longitudinal direction thereof, thereby enabling jigsaw 2—when embodied as a scrolling jigsaw—to be used as a semi-autonomous jigsaw.

In the embodiment, sensor system 27 comprises a sensor designed as camera 30, to which computer unit 28 is assigned.

Camera 30 of sensor system 27 is oriented toward a detection area 31 situated in the region of base plate 4, i.e. in a region through which marking line 24—which is used as specified path 23—extends as viewed from above, and toward which saw blade 8 is oriented. Using sensor system 27 comprising camera 30 which is oriented toward detection area 31, marking line 24 is detected at individual points 32 that lie on search rows 33 which extend transversely to working direction 6 and overlap detection area 31, and therefore, when analog image processing is used, the data captured using sensor system 27 are forwarded to computer unit 28, where the trajectory of marking line 24 and, therefore, the course thereof relative to longitudinal axis 25 can be detected. Computer unit 28 transmits control signals to control unit 29 which then sets saw blade angle 34 as a function of the superposed user guidance, using an actuating device comprising a controller e.g. in the form of a stepping motor. The inclination angle of saw blade 8, which is defined relative to longitudinal axis 25, is labelled as saw blade angle 34.

In the embodiment depicted in FIG. 3, detection area 31 is bounded by dash-dotted line 35, which overlaps the edges of a cut-out 36 provided in base plate 4, and so detection area 31 is delimited by the edges of cut-out 36 during use according to the invention.

Detection area 31 is primarily symmetrical about longitudinal axis 25, on which rotational axis 22 of saw blade 8 also lies, saw blade 8 extending via the saw blade plane thereof in the direction of longitudinal axis 25 when longitudinal axis 25 coincides with the marking line.

When detection area 31, which is a preferred solution, lies within the field of view of the user, the user is able to immediately discern the extension of marking line 24 on the basis of angle 34 of saw blade 8 relative to longitudinal axis 25, wherein, advantageously, the position of longitudinal axis 25 relative to base plate 4 is also marked e.g. using a marking arrow 37 that extends in the direction of longitudinal axis 25. In the sense of an orientation of jigsaw 2 that is typically aimed for, in which longitudinal axis 25 thereof lies on particular marking line 24, the user is therefore shown how to guide jigsaw 2 for the particular purpose.

Detection area 31 also delimits the region in which jigsaw 2 is guided semi-autonomously with reference to values captured using sensors, and is therefore oriented toward particular marking line 24 via the automated adjustment of saw blade angle 34 independently of the user's requirements. If marking line 24 leaves the region that is identified using sensors and is used as detection area 31, the user therefore also loses the support of the machine in guiding jigsaw 2 along a particular marking line 24; thus, when marking line 24 wanders out of the detection area, a signal is advantageously triggered, in particular an acoustic signal, which is advantageously accompanied by the machine being automatically shut off.

Figure 2:
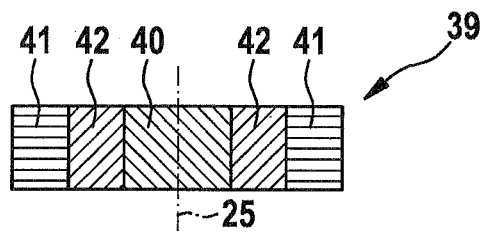

Since the semi-autonomous guidance of jigsaw 2 ensures that the user need only orient jigsaw 2 toward particular marking line 24 in an approximate manner, it is typically not necessary for the user to follow and observe marking line 24 exactly; instead, it is sufficient for the user to be informed that marking line 24 still extends through detection area 31, thereby enabling the user to focus on detection area 31 and on information regarding critical deviations. This can take place e.g. using related color schemes in the region of detection area 31, or using color schemes of separate display elements 38, one of which is disposed on the end face of housing 3 and comprises an upwardly facing display field 39 which is shown alone in a top view in FIG. 2. Display field 39 advantageously comprises color fields 40, 41 and 42, of which central color field 40 is e.g. green, outer color fields 41 are red, and color fields 42 situated therebetween are yellow, thereby ensuring that the user is easily informed about the regions in which he is moving and, when one of the outer color fields 41 illuminates, is notified that jigsaw 2 is being operated just within the limits within which the guidance thereof is automatically supported.

Optionally, related color markings can also be depicted within detection area 31. In the embodiment shown in FIG. 3, detection area 31 is mechanically delimited or marked. In contrast, the embodiment depicted in FIG. 4 shows a base plate 4 which is closed outside of a working region 9 around saw blade, and is preferably at least partially transparent, in particular in the region of detection area 43 which is likewise indicated using a dash-dotted line.

Considering that, during practical application, only one acute-angled region 44 which is symmetric about longitudinal axis 25 in particular comes into play in regards to the rotation of saw blade 8, detection area 43 shown in FIG. 4 is delimited in a trapezoidal shape, it being possible to display this delimitation on base plate 4 in a manner that is visible to the user, or to mark it in any other manner. In the same manner as explained with reference to FIGS. 2 and 3, the detection area can also be used here as a display field, and can therefore also be used as an optical display field.

Preferably in the region of the transition to step 17, an illumination source 45 can also be provided in the front-wall region 13 of housing 3, which points toward working region 9 and/or detection area 31 or 43 and which can be used, given an appropriate marginal sharpness of the illuminated field, to emphasize the detection area accordingly and thereby depict it in a delineated manner. In conjunction with such a solution in particular, it can also be advantageous to work with color codings, wherein different color fields can be provided in the sense of the explanations provided above, each one being irradiated by an illumination source of the particular color.

It is likewise possible to use detection area 31, 43 as a whole to characterize a particular operating state and to thereby present only the particular state in a coded manner by illuminating the detection area or parts of the detection area using a single color.

Transition states can also be signalled, in particular, using optical means i.e. flowing color transitions.

If this is implemented using mechanical means, it can be advantageous—as indicated in FIG. 3 using dash-dotted lines—to provide projections on the edge of the detection area, which extend toward longitudinal center line 25 and therefore away from the diametrically opposed edges of cut-out 36, and which are used during observation of marking line 24 to indicate that marking line 24 is approaching the limits of detection area 31. In particular, projections 46 can also coincide with search rows 33, therefore forming points 32 to be detected by camera 30, which lie between search rows 33 and marking line 24, similar to the intersection points, limited to the relevant edge regions in the overlap with marking line 24.

In summary, the invention provides a power tool 1, in particular in the form of a hand-held jigsaw 2 to be operated—using a sensor system 27 for observing a detection area 31, 43—in a manner that is semi-autonomous in particular and supports the user in terms of guidance; within detection area 31, 43, the orientation of the target working direction, as specified path 23 for saw blade 8, which is being used as tool 7, is detected relative to jigsaw 2, for downstream control means 26 which are used to orient saw blade 8 to specified path 23 via rotation about longitudinal axis 25 thereof, thereby ensuring that the user, while guiding jigsaw 2, need only make certain that specified path 23 extends within detection area 31, 43.

The embodiment of the power tool according to the invention also makes it easier, in particular, for the user to place the tool on the work piece with great precision.

What is claimed is:

1. A method for operating a hand-held power tool having a working region for a power tool (7) for processing a work piece (5), and comprising an auxiliary device for guiding the power tool (1) in a manner oriented toward a specified path (23), wherein the auxiliary device comprises a sensor system (27) having a detection area (31; 43) situated around the working region (9), and means in the viewing field (10) of the user for visualizing the detection area (31; 43) and the position thereof relative to the specified path (23), wherein mechanical means are provided for displaying the position of the detection area (31, 43) relative to the specified path (23), and wherein the mechanical display means are formed by parts of the power tool (1), comprising steps of:

guiding the tool (7) using an auxiliary device, oriented to a specified path (23), for processing the work piece (5), wherein the tool (7) is guided using a sensor system (27) which is oriented toward a detection area (31, 43), the position of which is oriented relative to the working region (9) of the tool (7), and the position of the detection area (31, 43) relative to the specified path (23) is signalled.

2. The method according to claim 1, wherein the deviation of the processing point of the tool (7) from the specified path (23), which is coded and/or weighted on the basis of the position of the detection area (31, 43), is symbolized by changing the lighting intensity and/or the color.

3. The method according to claim 1, wherein if the specified path (23) wanders out from the detection area (31, 43), a warning signal in the form of an additional and primarily acoustic warning signal is triggered and/or the power tool (1) is shut off.

4. The method according to claim 1, wherein when the power tool (1) is placed on a work piece (5), the position of the detection area (31, 45) relative to the starting point of the tool (7) on the work piece (5), which is determined by the specified path (23), is signalled.

5. A hand-held power tool, comprising:

a working region for a power tool (7) for processing a work piece (5), and comprising an auxiliary device for guiding the power tool (1) in a manner oriented toward a specified path (23), wherein the auxiliary device comprises a sensor system (27) having a detection area (31; 43) situated around the working region (9), and means in the viewing field (10) of the user for visualizing the detection area (31; 43) and the position thereof relative to the specified path (23), wherein mechanical means are provided for displaying the position of the detection area (31, 43) relative to the specified path (23), and wherein the mechanical display means are formed by parts of the power tool (1), wherein optical means are provided adjacent to the working region (9) for displaying the position of the detection area (31, 43) relative to the specified path (23), and wherein a deviation of the working tool (7) from the specified path (23) is weighted in terms of a degree of deviation from the specified path (23) and is visualized using a display field (39) of a display element (38).

6. The power tool according to claim 5, wherein the mechanical display means are adjacent to the working region (9).

7. The power tool according to claim 5, wherein the optical display means are disposed at a distance from the working region (9) on the housing (3) of the power tool (1).

8. The power tool according to claim 5, wherein the power tool (1) is designed as a semi-autonomous jigsaw (2) comprising a saw blade (8) which is pivotable about a rotational axis (22) that extends in the longitudinal direction thereof, and is directionally guided using a servo unit (29) in a manner oriented to the specified path (23).

9. A hand-held power tool, comprising:

a working region for a power tool (7) for processing a work piece (5), and comprising an auxiliary device for guiding the power tool (1) in a manner oriented toward a specified path (23), wherein the auxiliary device comprises a sensor system (27) having a detection area (31; 43) situated around the working region (9), and means in the viewing field (10) of the user for visualizing the detection area (31; 43) and the position thereof relative to the specified path (23), wherein mechanical means are provided for displaying the position of the detection area (31, 43) relative to the specified path (23), and wherein the mechanical display means are formed by parts of the power tool (1), wherein optical means are provided for displaying the position of the detection area (31, 43) relative to the specified path (23), and wherein the particular deviation of the working tool (7) from the specified path (23) is weighted in terms of the degree of deviation from the specified path (23), and is visualized using the display means, in particular in a display field (39) of a display element (38).

10. A hand-held power tool, comprising:

a working region for a power tool (7) for processing a work piece (5), and comprising an auxiliary device for guiding the power tool (1) in a manner oriented toward a specified path (23), wherein the auxiliary device comprises a sensor system (27) having a detection area (31; 43) situated around the working region (9), and means in the viewing field (10) of the user for visualizing the detection area (31; 43) and the position thereof relative to the specified path (23), wherein mechanical means are provided for displaying the position of the detection area (31, 43) relative to the specified path (23), and wherein the mechanical display means are formed by parts of the power tool (1), and wherein the particular deviation of the working tool (7) from the specified path (23) is weighted in terms of the degree of deviation from the specified path (23), and is visualized using the display means, in particular in a display field (39) of a display element (38).

11. The power tool according to claim 1, wherein the mechanical display means are adjacent to the working region (9).

12. The power tool according to claim 1, wherein the optical display means are disposed at a distance from the working region (9) on the housing (3) of the power tool (1).

13. The power tool according to claim 1, wherein the power tool (1) is designed as a semi-autonomous jigsaw (2) comprising a saw blade (8) which is pivotable about a rotational axis (22) that extends in the longitudinal direction thereof, and is directionally guided using a servo unit (29) in a manner oriented to the specified path (23).

14. The power tool according to claim 9, wherein the mechanical display means are adjacent to the working region (9).

15. The power tool according to claim 9, wherein the optical display means are disposed at a distance from the working region (9) on the housing (3) of the power tool (1).

16. The power tool according to claim 9, wherein the power tool (1) is designed as a semi-autonomous jigsaw (2) comprising a saw blade (8) which is pivotable about a rotational axis (22) that extends in the longitudinal direction thereof, and is directionally guided using a servo unit (29) in a manner oriented to the specified path (23).

17. The power tool according to claim 10, wherein the mechanical display means are adjacent to the working region (9).

18. The power tool according to claim 10, wherein the optical display means are disposed at a distance from the working region (9) on the housing (3) of the power tool (1).

19. The power tool according to claim 10, wherein the power tool (1) is designed as a semi-autonomous jigsaw (2) comprising a saw blade (8) which is pivotable about a rotational axis (22) that extends in the longitudinal direction thereof, and is directionally guided using a servo unit (29) in a manner oriented to the specified path (23).

* * * * *